Aug. 24, 1926.
G. A. KANE
1,597,160
CASTRATING KNIFE
Filed Nov. 30, 1925
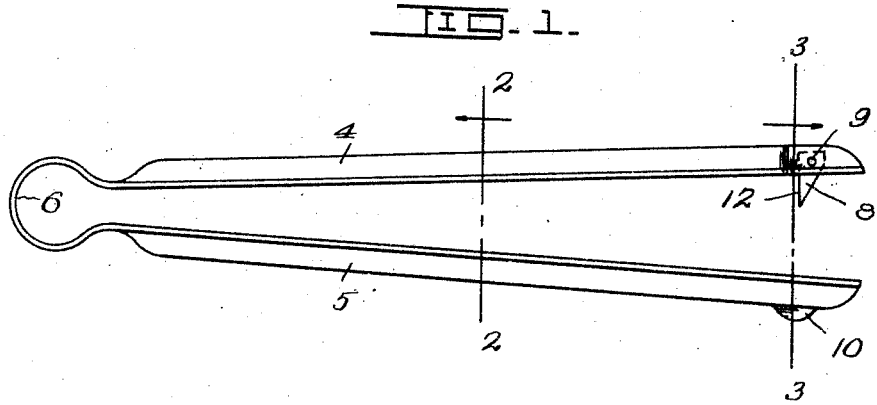
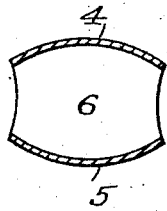
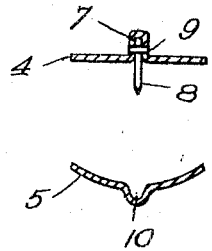
Witness:
Fred C. Fischer.
Inventor:
George A. Kane,
By
F. G. Fischer,
Attorney.

Patented Aug. 24, 1926.

1,597,160

UNITED STATES PATENT OFFICE.

GEORGE A. KANE, OF KANONA, KANSAS.

CASTRATING KNIFE.

Application filed November 30, 1925. Serial No. 72,257.

My invention relates to castrating knives and the principal object of the invention is to provide a knife of this character in which the blade is so protected that the operator or his assistant cannot become accidentally cut by the knife while in the act of castrating an animal.

A further object is to provide a simple and inexpensive castrating knife with which the operation of castrating an animal can be performed as easily and efficiently as with an ordinary knife and with the danger from use of the latter eliminated.

In order that the invention may be fully understood, reference will now be had to the accompanying drawing, in which:

Fig. 1 is a side elevation of the knife.

Fig. 2 is a cross section on line 2—2 of Fig. 1.

Fig. 3 is a cross section on line 3—3 of Fig. 1.

In carrying out the invention, I employ a pair of handles 4 and 5 connected at one end by spring means 6. The sides of the handle 4 near its free end are pressed toward each other to form a cavity 7 the sides of which grip the upper end of a blade 8 which is further secured in place by suitable means such as a rivet 9.

The handle 5 has a depression 10 formed therein to receive the blade 8 when the handles 4 and 5 are pressed toward each other. The blade 8 has a cutting edge 12 at its rear portions which extends approximately at right angles to the handle 4.

Preferably, the handles 4 and 5 and the spring 6 are stamped from one piece of sheet metal so that there will not be numerous parts to assemble and thus increase the cost of production. As shown by Figs. 2 and 3, the handles 4 and 5 are curved in cross section to form a convenient grip for the hand and to lend rigidity to said handles, so that they will not bend or spring out of shape when pressed toward each other.

In castrating a young animal, as a bull calf for instance, the knife is grasped in one hand and the scrotum with the other hand, and passed between the handles 4 and 5. The handles are then pressed toward each other and the knife is drawn backwardly to cut off the lower one-fourth or one-third of the scrotum, or enough to expose the ends of both testicles. The testicles may then be pulled out one at a time and removed, after which the cord is severed to prevent it from protruding from the incision.

The animal may be operated upon while in a standing or a reclining position.

By arranging the blade 8 so that its cutting edge 12 will be protected by the handles 4 and 5, it is obvious that the operation may be performed without risk to the operator or his assistant, or without injury to the animal by cutting places other than the point at which the operation is performed.

From the foregoing description it is apparent that I have provided a castrating knife embodying the advantages above pointed out, and while I have shown and described the preferred construction, combination and arrangement of parts, I reserve the right to make such changes as properly fall within the spirit and scope of the invention as claimed.

Having thus described my invention, what I claim and desire to secure by Letters Patent, is:

A castrating knife consisting of a blade and a pair of handles united at one end by spring means all of which are stamped from one piece of sheet metal, the sides of one of said handles being pressed toward each other adjacent its free end to grip the blade and the companion handle having a depression formed therein to receive the point of the blade when the handles are forced toward each other.

In testimony whereof I affix my signature.

GEORGE A. KANE.